Patented Oct. 16, 1934

1,977,445

UNITED STATES PATENT OFFICE 1,977,445

PROCESS OF MAKING AN ADHESIVE AND PRODUCT THEREOF

Irving Fink Laucks, Seattle, Wash., assignor to I. F. Laucks, Inc., Seattle, Wash., a corporation of Washington No Drawing. Application January 21, 1933, Serial No. 652,936

8 Claims. (Cl. 87—17)

Many advantages resulting from the use of cellulose xanthogenates as adhesives for wood and particularly in the manufacture of plywood have been disclosed in co-pending applications Serial Nos. 634,931, filed September 26, 1932, and 646,525, filed December 9, 1932. There are, however, certain difficulties peculiarly connected with the use of cellulose xanthogenates as plywood glues.

I have made a most important discovery of methods and processes of manufacture of viscoses and methods and processes of use thereof which overcome these difficulties which render viscoses available for economic and practical usefulness as adhesives for plywood.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

For the purposes of this disclosure the term "viscose" may be defined to include all cellulose xanthogenates or salts of cellulose xanthogenic acid. The base material of such xanthogenates may be cotton, wood pulp, ground wood, wood flour, purified cellulose, oxycellulose, cellulose partially purified, reverted cellulose, seed coats as soya bean seed coats, straw, etc. These xanthogenates are in general prepared by treatment of the cellulosic material with caustic soda and with carbon bisulphide. It is particularly to be noted that the term "viscose", as herein used, is not to be restricted to the one product of pure cellulose originally described by Messrs. Cross & Bevan.

The use of glue by plywood plants is unique in several respects. Glue is used by this industry in very large amounts. The glue demand is more or less fluctuating even from hour to hour and the supply of glue must be immediately available to meet the fluctuating demands, furthermore the final glue mixture must be easily made by relatively unskilled labor.

The difficulties of the use of viscose (cellulose xanthogenates) in the manufacture of plywood, particularly, are evident. The making up of a batch of viscose from a cellulosic base requires time, varying with the nature of the base and the method used. The time may vary from hours to even days in extreme cases. The plywood plant demand cannot be foreseen hours ahead and the use of a glue which takes so long to prepare presents many difficulties in plywood plant operation. It must be understood that these plants place a requirement of not to exceed one-half hour for the making up of the finished glue and in many cases this time must be as short as fifteen minutes.

Furthermore, in general viscoses in the wet state have the inherent property of change. If a batch of wet viscose adhesive could be made up and held constant with only minor physical or chemical change until it was used up over a period of hours or days, it would be possible to store such prepared material ready to use. This, however, is not the case. Physical and chemical changes do occur in viscose in the wet state and these changes affect the usefulness and efficiency of the viscose adhesives.

A substance having these characteristics is consequently very difficult or almost impossible to introduce in the plywood industry, that is to the plants making plywood in large quantities and in which the making of plywood is the chief or only business. Where plywood or veneers are made on a smaller scale and where the necessity of large production is not so great, viscose, as it has been known so far, could be used with a considerable degree of efficiency.

I have discovered, however, that I can produce viscose in a state which is capable of being stored for indefinite periods without appreciable deterioration and which can be readily converted into a wet plywood glue in a short time at point of use. This product then solves the problem of the making of a plywood glue which will have the necessary properties of being readily and practically usable by the plywood industry and at the same time give the benefits that are inherent with reverted cellulose glue line.

To this end I precipitate a salt of cellulose xanthogenic acid. This may be either the sodium or potassium salt, or it may be salt of one of the heavy metals, such as calcium, magnesium, zinc, etc. Some of these salts are soluble in water and others are not. I find, however, that any of them may be dissolved in a caustic soda solution and that when used in solution with caustic soda they give better adhesion than when simply in water solution.

To exemplify the process utilizing the sodium salt, I may make a viscose solution as described in my co-pending applications Serial Nos. 634,931 and 646,525. To the solution of viscose thus made I may add methyl or ethyl alcohol until the sodium salt is precipitated. This precipitate is collected, dried in suitable manner and ground through about 30-mesh screen. The requisite amount of powder is then added to a 2% caustic soda solution in a glue mixer and stirred for ten minutes, giving the finished glue. This can be spread readily with the present spreaders in use in the plywood industry and in fact can be handled just the same as the protein glues the plywood industry is now accustomed to. Finer grinding of the dried product decreases the time required for stirring after addition of same to the caustic soda solution. In place of alcohol to precipitate the sodium salt I may also use sodium chloride solution for example.

I may illustrate one method of utilization of my process as follows: 188 parts of sulphite pulp are immersed in 4700 parts of 17% caustic soda solution for three hours at approximately 65° F. The mass is then pressed to 752 parts of mercerized, crumbly cellulose and aged in this state for 48 hours at a temperature of approximately 65° F. At the end of this period 75 parts of carbon bisulphide are added and the mixture permitted to stand covered for approximately 2¾ hours. The yield resulting from this process is approximately 793 parts of cellulose xanthate in a crumbly pellet-like condition. This material is then dissolved in 1200 parts of water and precipitated with 1600 parts of alcohol. The precipitate is removed and dried by any suitable means to approximately 255 parts of material, which is the product in a stage suitable for storing without appreciable change or deterioration of properties. When it is desired to make up the glue for use this 255 parts of precipitated viscose is dissolved to approximately 2120 parts of a 2% solution of caustic soda resulting in a stringy glue having a viscosity of approximately 20 on the McMichael viscosimeter at a temperature of 60-65° F.

Another illustration may be given as follows: Follow the same procedure as in the preceding example to the point of securing the 793 parts of cellulose xanthate. This 793 parts of material is dissolved in 1200 parts of water and precipitated with 750 parts of a 30% solution of zinc chloride. This precipitate is separated and the moisture content removed to a total weight of 324 parts of material comprising the reaction products of the process. When it is desired to use this material for an adhesive it may be ground or otherwise comminuted, dissolved in 2430 parts of 10% caustic soda solution resulting in a light-colored stringy glue having a viscosity of approximately 10 on the McMichael viscosimeter at a temperature of approximately 65° F.

The adhesives prepared in accordance with the examples above given are illustrative of the principles involved in my invention and are to be considered as illustrations only of such two methods. There are many other methods of operation of the principles of the process and other raw materials may be used as bases and other precipitants may be used and other proportions of the various ingredients may be used.

To make the lime salt I precipitate a viscose solution with a soluble calcium compound, as for example calcium chloride, collecting and drying the precipitate, grinding same and making glue from it the same as described with the sodium salt.

Another method of preparing the sodium salt may be exemplified as follows: Prepare viscose up to the point of solution of same, then instead of water being added to the reaction product of the carbon bisulphide and the mercerized cellulose, alcohol is added to this reaction product. The addition of alcohol at this stage precipitates a compound which can be dried and stored without appreciable change or deterioration of its properties. This compound is believed to be the sodium salt of cellulose xanthogenic acid. This procedure has advantages from a manufacturing standpoint, in that it uses less alcohol and dilutes the alcohol less with water, thus making the recovery of same easier and more economical, and further one step in the manufacture of the dry compound is eliminated. Other precipitants may be substituted for alcohol in the last described method, as, for example, solutions of calcium chloride, zinc chloride, etc.

The dry cellulose xanthogenate compounds thus produced are stable as long as they are kept dry and can be stored for a considerable length of time, and as shown they also are readily converted into plywood glues.

Wherever the designation "dry" is applied to the product disclosed and claimed herein it is to be understood that I include thereby not only the state designated as free from water or "bone dry", but also the state of the precipitate after being partially freed of water by pressing, filtering, centrifuging, etc. To come within my use of the designation "dry" the precipitate must be sufficiently freed from water so that it has the properties of a solid as distinguished from the properties of a liquid.

I find that the life of the final wet glue made as above described may be increased if instead of using caustic soda to dissolve the powder one uses a solution containing sodium thiocarbonate, sodium sulphide, sodium carbonate as well as caustic soda. The substances named are decomposition products of the sodium salt of cellulose xanthogenic acid, that is they are formed when the sodium salt of cellulose xanthogenic acid decomposes and reverts to cellulose.

The adhesive product made in accordance with my invention is obviously suitable for gluing many substances other than wood.

Other modes of applying the principle of the invention may be employed instead of those explained, change being made as regards the features herein disclosed, provided the features stated in any of the following claims, or the equivalent of such be employed.

I therefore particularly point out and distinctly claim as my invention:

1. An adhesive comprising the reaction products resulting from the treatment of a dry salt of cellulose xanthogenic acid with a solution embodying the decomposition products of the sodium salt of cellulose xanthogenic acid and caustic soda.

2. An adhesive comprising the reaction products resulting from the treatment of a dry salt of cellulose xanthogenic acid with a solution containing sodium thiocarbonate and caustic soda.

3. An adhesive comprising the reaction products resulting from the treatment of a dry salt of cellulose xanthogenic acid with a solution containing sodium sulphide and caustic soda.

4. An adhesive comprising the reaction products resulting from the treatment of a dry salt of cellulose xanthogenic acid with a solution containing sodium carbonate and caustic soda.

5. A process of making an adhesive, which comprises preparing a dry salt of cellulose xanthogenic acid, and redissolving such salt to glue-spreading consistency in an aqueous solution containing a decomposition product of the sodium salt of xanthogenic acid.

6. A process of making an adhesive, which comprises preparing a dry salt of cellulose xanthogenic acid, and redissolving such salt to glue-spreading consistency in an aqueous solution having an excess of alkali over solution requirements.

7. A process of making an adhesive, which comprises preparing a dry salt of cellulose xanthogenic acid, and redissolving such salt to glue-spreading consistency in an aqueous solution having an excess of caustic soda over solution requirements.

8. A process of making an adhesive, which comprises preparing a dry calcium salt of cellulose xanthogenic acid, and redissolving such salt to glue-spreading consistency in an aqueous solution having an excess of alkali over solution requirements.

IRVING FINK LAUCKS.